United States Patent
Hendriks et al.

(10) Patent No.: US 6,643,396 B1
(45) Date of Patent: Nov. 4, 2003

(54) ACQUISITION OF 3-D SCENES WITH A SINGLE HAND HELD CAMERA

(76) Inventors: Emile Hendriks, 4, Mekelweg, 2628 CD Delft (NL); André Redert, 2624 KV Delft (NL)

(*) Notice: Subject to any disclaimer, the term of this patent is extended or adjusted under 35 U.S.C. 154(b) by 650 days.

(21) Appl. No.: 09/595,402

(22) Filed: Jun. 12, 2000

Related U.S. Application Data (60) Provisional application No. 60/138,965, filed on Jun. 11, 1999.

(51) Int. Cl.[7] .......................... G06K 9/00; H04N 15/00
(52) U.S. Cl. .......................... 382/154; 382/285; 348/42; 348/49; 356/12; 250/559.23; 250/559.31
(58) Field of Search ................ 382/154, 285; 345/419–427; 356/12–14; 348/578, 580, 42–60; 250/559.23, 559.29–559.31

(56) References Cited

U.S. PATENT DOCUMENTS

| | | | |
|---|---|---|---|
| 2,352,176 A | 6/1944 | Bogopolsky | 95/18 |
| 2,413,996 A | 1/1947 | Ransdell | 95/18 |
| 2,736,250 A | 2/1956 | Papritz | 95/18 |
| 3,254,933 A | 6/1966 | Latulippe | 352/57 |
| 3,891,313 A | 6/1975 | Murphy | 353/8 |
| 4,178,090 A | 12/1979 | Marks et al. | 354/117 |
| 4,436,369 A | 3/1984 | Bukowski | 352/62 |
| 4,437,745 A | 3/1984 | Hajmal | 354/117 |
| 4,523,226 A | 6/1985 | Lipton et al. | 358/88 |
| 4,525,045 A | 6/1985 | Fazekas | 352/57 |
| 4,568,970 A | 2/1986 | Rockstead | 358/91 |
| 4,583,117 A | 4/1986 | Lipton et al. | 358/92 |
| 4,678,298 A | 7/1987 | Perisic | 352/62 |
| 4,687,310 A | 8/1987 | Cuvillier | 354/115 |
| 4,967,267 A | 10/1990 | Gallaher, Jr. | 358/88 |
| 5,119,234 A | 6/1992 | Van Der Walt | 359/472 |
| 5,349,403 A | 9/1994 | Lo | 354/114 |
| 5,532,777 A | 7/1996 | Zanen | 354/114 |
| 5,828,913 A | 10/1998 | Zanen | 396/324 |
| 5,883,662 A | 3/1999 | Zanen | 348/49 |

FOREIGN PATENT DOCUMENTS

| | | |
|---|---|---|
| EP | 0 416 727 A3 | 3/1991 |
| GB | 634092 | 8/1946 |
| JP | 2251810 | 9/1990 |

OTHER PUBLICATIONS

Goshtasby, Ardeshir, et al.; *Design of a Single–Lens Stereo Camera System; 1993;* in "Pattern Recognition" vol. 26, No. 6, pp. 923–936.

O. Faugeras, *"Three–Dimensional Computer Vision, A Geometric Viewpoint"*, Chapter 3 Modeling and Calibrating Cameras; MIT Press, 1993.

(List continued on next page.)

*Primary Examiner*—Bhavesh M. Mehta
*Assistant Examiner*—Aaron Carter
(74) *Attorney, Agent, or Firm*—Brown & Michaels PC (57) ABSTRACT

The acquisition of 3-D scenes by a single hand-held camera is disclosed. The camera is preferably mounted on a lens attachment with four mirrors, enabling stereo capturing of the scene. The signal processing tasks involved, camera calibration and correspondence estimation, are each disclosed. Both fixed and self-calibration methods benefit from the use of the lens attachment to acquire a scene. Specifically, full self-calibration of the camera is enabled, without loss of absolute scale as seen in prior art stereo self-calibration methods. Accurate 3-D models are obtained with the method of the invention.

20 Claims, 6 Drawing Sheets

OTHER PUBLICATIONS

F. Pedersini, D. Pele, A. Sarti and S. Tubaro, "*Calibration and Self–Calibration of Multi–Ocular Camera Systems*", in proceedings of the *International Workshop on Synthetic–Natural Hybrid Coating and Three Dimensional Imaging* (IWSNHC3DI'97), Rhodos, Greece, pp. 81–84, 1997.

M. Pollefeys, R. Koch, M. Vergauwen and L. van Gool, "*Flexible Acquisition of 3D Structure from Motion*", in proceedings of the *IEEE Image and Multidimensional Digital Signal Processing* (*IMDSP*) *Workshop '98*, pp. 195–198, 1998.

P.A. Redert and E.A. Hendriks, "*Self Calibration of Stereo Cameras with Lens Distortion*", Proceedings of the IEEE *Image and Multidimensional Digital Signal Processing* (*IMDSP*) *Workshop '98*, pp. 163–166, 1998.

] P.A. Redert, E.A. Hendriks and J. Biemond, "*Correspondence Estimation in Image Pairs*", *IEEE Signal Processing Magazine,* special issue on 3D and stereoscopic visual communication, vol. 16, No. 3, pp. 29–46, May 1999.

J. Weng, P. Cohen and M. Herniou, "*Camera Calibration with Distortion Models and Accuracy Evaluation*", in *IEEE Transactions on PAMI,* vol. 14, No. 10, pp. 965–980, 1992.

ACQUISITION OF 3-D SCENES WITH A SINGLE HAND HELD CAMERA

REFERENCE TO RELATED APPLICATIONS

This application claims an invention which was disclosed in Provisional Application No. 60/138,965, filed Jun. 11, 1999, entitled "ACQUISITION OF 3-D SCENES WITH A SINGLE HAND HELD CAMERA". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of cameras. More particularly, the invention pertains to hand-held cameras and the acquisition of three-dimensional scenes.

2. Description of Related Art

Stereographic photography is the method of producing images which are apparently three-dimensional by recording separate left- and right-eye images. The viewer reconstructs the 3-D image by viewing the two separate 2-D images simultaneously. Stereographic photography has been known since at least the late 19th century, when stereo viewers were a popular parlor accessory.

Such stereo views have historically been created with two lenses on a single camera, spaced apart by approximately the inter-ocular distance of a human head. The Stereo Realist™ series of 35 mm still cameras, popular in the 1950's, are an example of this kind of imaging. Left and right views were recorded simultaneously through two lens/shutter sets on alternate frames of the 35 mm film. The later Nimslo™ system used four lenses for essentially the same approach.

Stereo movies appeared in the 1950's. The images were typically created either using two synchronized cameras, or a two-lens system on a single camera. Similarly, the various Stereo TV systems have typically used two cameras (see Lipton, et al, U.S. Pat. No. 4,583,117) or a single camera with two lenses (Lipton, et al, U.S. Pat. No. 4,523,226).

In the area of 3-D scene acquisition by stereo equipment, two signal processing tasks are involved: calibration of the camera pair [1] and estimation of corresponding pixels in the image pair [5].

In the area of camera calibration, there are two different techniques: fixed and self-calibration. In fixed calibration, all camera parameters are extracted off line by placing a special object with known geometry in front of the cameras and processing of the camera images [1, 2]. This method provides very accurate and complete results (all parameters are obtainable). Additionally, calibration reduces correspondence estimation from a 2-D search problem to a more efficient and reliable 1-D search [5].

However, fixed calibration suffers from a number of disadvantages. A special calibration object and user interaction is required. Each time the camera parameters change, e.g. due to zooming or change of convergence angle, the calibration has to be repeated.

Self-calibration circumvents these disadvantages. In this method, the correspondences are estimated first, in an image pair of the scene. After this, the camera parameters are extracted from the found correspondence field [4]. The price to be paid is two-fold. First, correspondence estimation is a more demanding task since no reduction from a 2-D to a 1-D search can be applied. Secondly, in self-calibration methods with normal stereo camera pairs, there is no reference to the standard SI meter. Thus the scale of the 3-D models is not obtainable by the prior art methods [3].

SUMMARY OF THE INVENTION

The acquisition of 3-D scenes by a single hand-held camera is disclosed. The camera is preferably mounted on a lens attachment with four mirrors, enabling stereo capturing of the scene. The signal processing tasks involved, camera calibration and correspondence estimation, are each disclosed. Both fixed and self-calibration methods benefit from the use of the lens attachment to acquire a scene. Specifically, full self-calibration of the camera is enabled, without loss of absolute scale as seen in prior art stereo self-calibration methods. Accurate 3-D models are obtained with the method of the invention.

DETAILED DESCRIPTION OF THE INVENTION

The acquisition of 3-D scenes with a very specific stereo camera is disclosed. Using camera calibration parameters, two light rays originating from a pair of corresponding pixels are constructed. The intersection of the two rays then provides the 3-D coordinates of a scene point.

Figure 1:
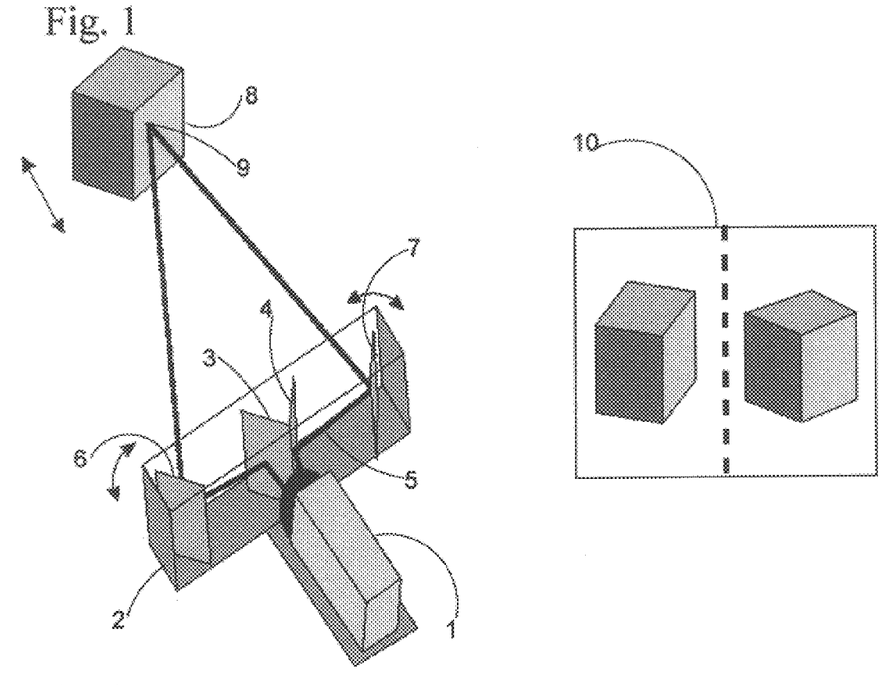
FIG. 1 shows an example of an apparatus of the present invention.

The apparatus is shown in FIG. 1. A single hand held camera (1) is mounted on a lens attachment (2) with mirrors as disclosed in U.S. Pat. Nos. 5,532,777, 5,828,913, and 5,883,662, the disclosures of which are herein incorporated by reference [7–9]. Briefly, the lens attachment preferably has a set of four mirrors in two pairs located in front of a camera lens. The outer two mirrors (6) and (7) face generally outward along the optical axis of the lens and the inner two mirrors (3) and (4) face generally inward into the lens. The centers of the outer two mirrors (6) and (7) are spaced apart by an appropriate interocular distance. The two inside mirrors (3) and (4) are together large enough to cover the complete viewing area of the lens, each taking exactly half of the lens viewing area. The two outside mirrors (6) and (7) are preferably bigger than the inside pair of mirrors (3) and (4) and large enough to cover the viewing area of the inside pair of mirrors (3) and (4) to avoid viewing area reduction. The convergence of the two outer mirrors (6) and (7) is adjustable by swiveling them simultaneously and equally about their centerlines with a ganging mechanism. The two center mirrors (3) and (4) may be fixed, or could be adjustable by being swiveled so that one side of each remains in tight contact with the other along the optical axis of the camera lens, and each makes a 45° or lesser angle to the optical axis.

Imagine that the directions of the incoming light rays (5) are reversed, then the two center mirrors (3) and (4) split the bundle of light rays (5) from the camera in two parts. The two side mirrors (6) and (7) redirect each bundle towards the scene (8). The convergence point (9) of the two bundles is adjustable by rotation of the side mirrors (6) and (7). The image (10) is also shown.

The small size and low weight of this stereo camera provide high user mobility. In addition, the use of a single camera is economical and does not require shutter synchronization of a camera pair. For storage, only one conventional recorder is needed. Both the calibration and correspondence estimation tasks benefit from this particular setup.

Correspondence estimation is based on photometric similarity of corresponding pixels. Photometrically unbalanced stereo cameras are a cause of errors, which is avoided to a large extent by the use of a single camera. As discussed in the background, there are two different calibration techniques: fixed and self-calibration. Both of these types of calibrations benefit from the apparatus shown in FIG. 1. In prior art self-calibration methods with normal stereo camera pairs, there was no reference to the standard SI meter. Thus the scale of the 3-D models were not obtainable [3]. The known geometry of the apparatus of the present invention provides the scale. The use of a single camera in concert with the lens attachment simplifies the stereo camera model without loss of generality.

Stereo Camera Model

Figure 2:
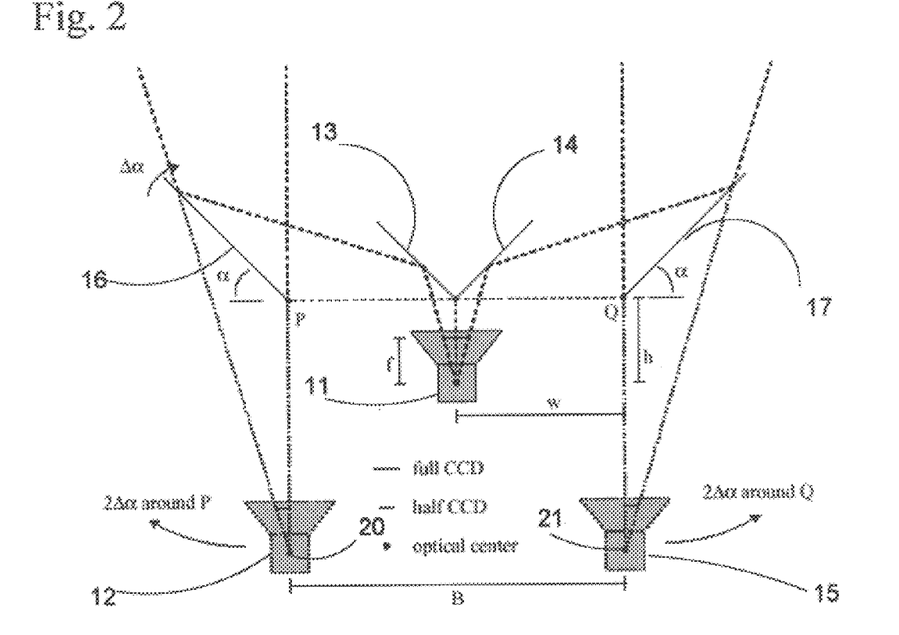
FIG. 2 shows the function of the mirrors in the apparatus of the present invention.

The camera model for the device is a novel version of the general model for stereo cameras in [4]. FIG. 2 shows the function of the mirrors (13), (14), (16) and (17) in the lens attachment. The single real camera (11) is split into two virtual cameras (12) and (15), each with half of the original CCD chip. The half CCDs are not centered on the optical axes (20) and (21) of the virtual left (12) and right cameras (15). The rotation of the two side mirrors (16) and (17) is mechanically coupled. To have any overlap in the two virtual camera images, $\alpha=45°+\Delta\alpha$, with $\Delta\alpha>0$. If the side mirrors (16) and (17) are rotated around point P and Q, the two virtual cameras (12) and (15) rotate around the same points with double speed.

Figure 3:
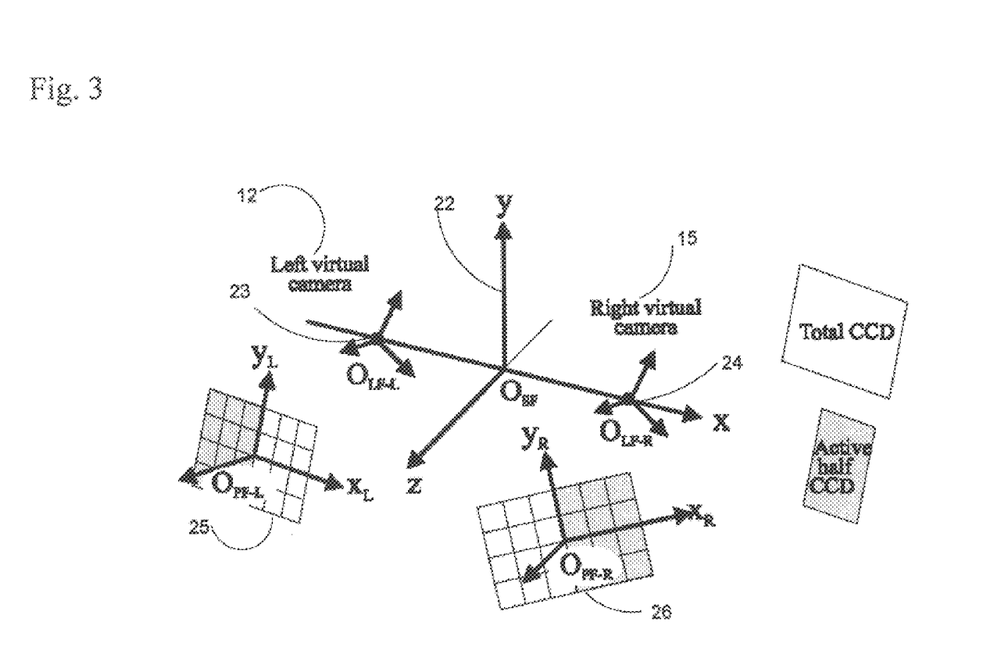
FIG. 3 shows a stereo camera model.

FIG. 3 shows the general stereo camera model from [4]. Five reference frames are defined, the stereo frame (22), the left/right lens frames (23) and (24) and the left/right projection frames (25) and (26). The camera baseline is B. The frame SF (22) is defined to be a right handed frame in which the two optical centers lie on the x-axis symmetrically around the origin, at $(-½B, 0,0)$ for the left camera and $(+½B, 0,0)$ for the right camera, in SF coordinates. From FIG. 2, it is deduced that:

$$B=2w+2(h+w)\sin 2\Delta\alpha+\epsilon_0 \qquad (1)$$

relating meters to angles. This provides a means for self-calibration in meters, instead of unknown units. The $\epsilon_0$ models remaining imperfections, and is assumed to be small.

The orientations of the left and right lens frames are defined by two sets of Euler angles $(\phi_x, \phi_y, \phi_z)$. The lens is present in the origin of the lens frames LF-L and LF-R, oriented in their xy planes. Radial symmetry in the lenses is assumed. At this point, the angle $\phi_z$ has no meaning. Instead of discarding $\phi_z$, it is used for the orientation of the CCD. The reference frame SF (22) is defined up to a rotation around the x-axis. An arbitrary equation is introduced that eliminates either $\phi_{x;L}$ or $\phi_{x;R}$, such as $\phi_{x;L}+\phi_{x;R}=0$. Ideally both are zero, but due to imperfections in the apparatus and the hand-cam this might not be the case:

$$\phi_{x;L}=\epsilon_1, \phi_{x;R}=-\epsilon_1 \qquad (2)$$

For the $\phi_{y;L}$ or $\phi_{y;R}$ ideally $\phi_{y;L}=2\Delta\alpha$ and $\phi_{y;R}=-2\Delta\alpha$. Allowing for small imperfections:

$$\phi_{y;L}=2\Delta\alpha+\epsilon_2, \phi_{x;R}=-2\Delta\alpha+\epsilon_3 \qquad (3)$$

It is assumed that the CCD is perfectly flat and has perfectly perpendicular image axes. The image formation is invariant for scaling of the triplet focal length, horizontal and vertical pixel size. Therefore, without loss of generality, the horizontal size of the pixels are chosen to be equal to 1 and the vertical size equal to R, the pixel aspect ratio. The positions of the projection frames $PF_{L/R}$ (total CCD chip) relative to the lens frames $LF_{L/R}$ are defined by a single vector $O_{PF}^{X_{LF}}$, $O_{PF}^{Y_{LF}}$, $O_{PF}^{Z_{LF}}$ since they refer to the same physical camera. The first two numbers define the intersection of the lens optical axis with the total CCD (mispositioning) and the third is the focal length f:

$$O_{PF}^{X_{LF}}=\epsilon_4, O_{PF}^{Y_{LF}}=\epsilon_5, O_{PF}^{Z_{LF}}=f \qquad (4)$$

Since a change of focal length in cameras is usually performed by movement of the lens rather than the CCD chip, h is modeled in (1) as a linear function of f:

$$h=a+bf \qquad (5)$$

a and b are parameters estimated to establish a relationship between w and h. The orientation of the projection frames $PF_{L/R}$ (total CCD chip) relative to the lens frames $LF_{L/R}$ is defined by a single set of Euler angles $(\theta_x, \theta_y, \theta_z)$. $\theta_z$ relates to the rotation of the projection frame. This is already modeled with $\phi_z$ and thus $\theta_z=0$ is used.

For the $\phi_z$:

$$\phi_{z;L}=\epsilon_6, \phi_{z;R}=\epsilon_7 \qquad (6)$$

The $\theta_x$ and $\theta_y$ model the non-orthogonal CCD placement with respect to the optical axis. Thus:

$$\theta_x=\epsilon_8, \theta_y=\epsilon_9, \theta_z=0 \qquad (7)$$

Since mispositioning and misorientation of the CCD is incorporated in equations (4) and (7), lens distortion can be modeled more simply than in [6]. The radial distortion parameter $K_3$ is used:

$$K_3=\epsilon_{10} \qquad (8)$$

The stereo camera model preferably contains the following parameters. For fixed calibration, there is a baseline B, a convergence angle $\Delta\alpha$, a focal length f, a pixel aspect ratio R and ten error parameters $\epsilon_1 \ldots \epsilon_{10}$ which are assumed to be small.

For self-calibration, the baseline B is discarded from the model by setting it to 1 during the calibration [4]. Afterwards, it can be obtained by equation (1), provided that w, a and b have been determined before hand.

Acquisition Scheme

Figure 4:
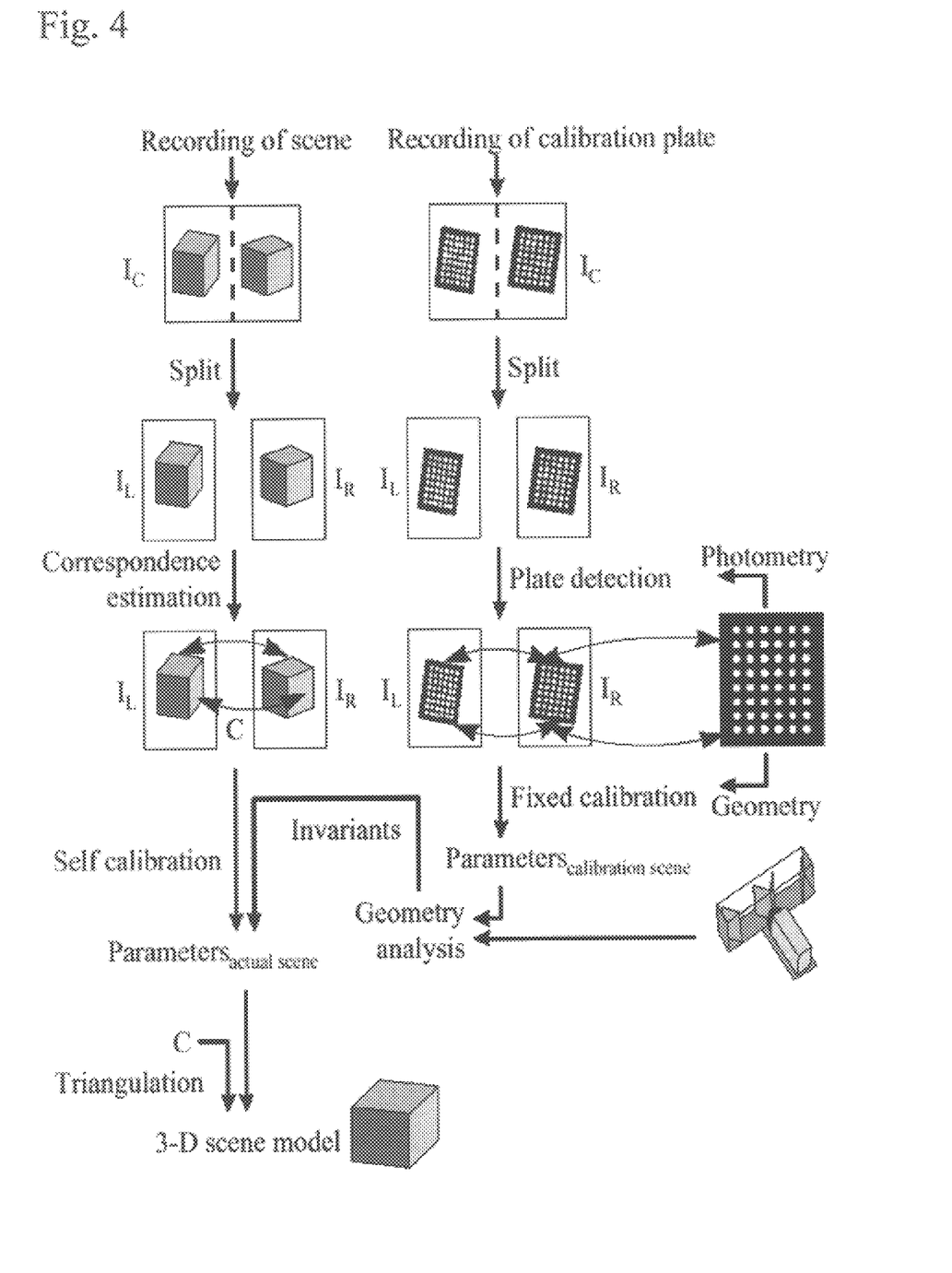
FIG. 4 shows a complete scheme of acquisition according to the present invention.

FIG. 4 shows the complete scheme of acquisition. First, the hand-cam is mounted on the lens attachment. Then, a fixed calibration is performed for several values of convergence angle $\Delta\alpha$ and focal distance (zoom) f in order to obtain a, b and w. In addition, life-time constants such as the pixel aspect ratio R are obtained. The constants obtained will be invariant during the recording of the actual scene.

Then the scene is recorded, during which any change in convergence angle and zoom are allowed. Afterwards, the sequence is processed according to the left route in FIG. 4. After correspondence estimation, self-calibration is applied [4]. The invariant (1) then enables 3-D model acquisition with the correct scale.

Experiments

Figure 5A:
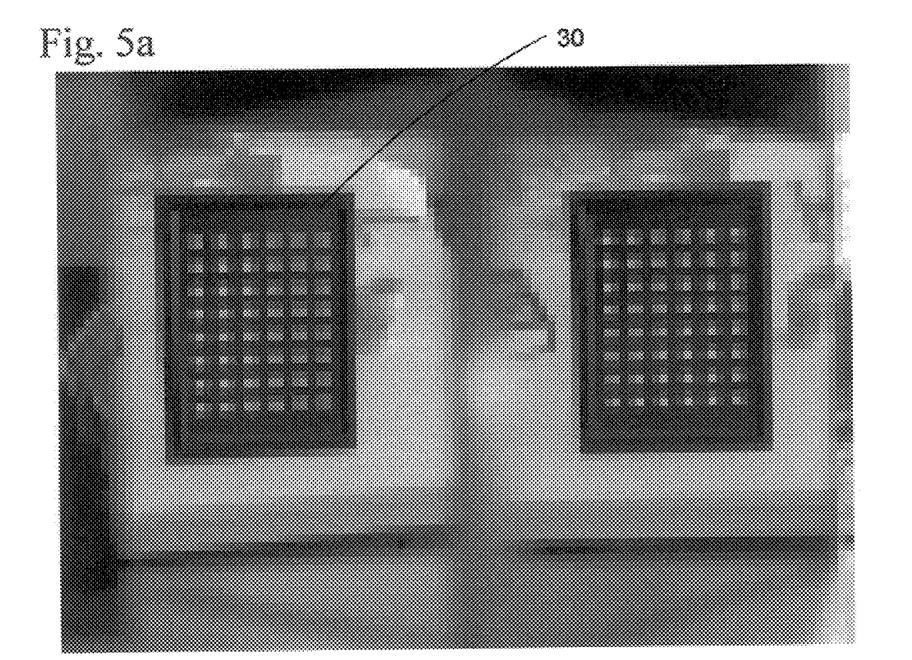
FIG. 5a shows an image of the calibration plate of the present invention.
Figure 5B:
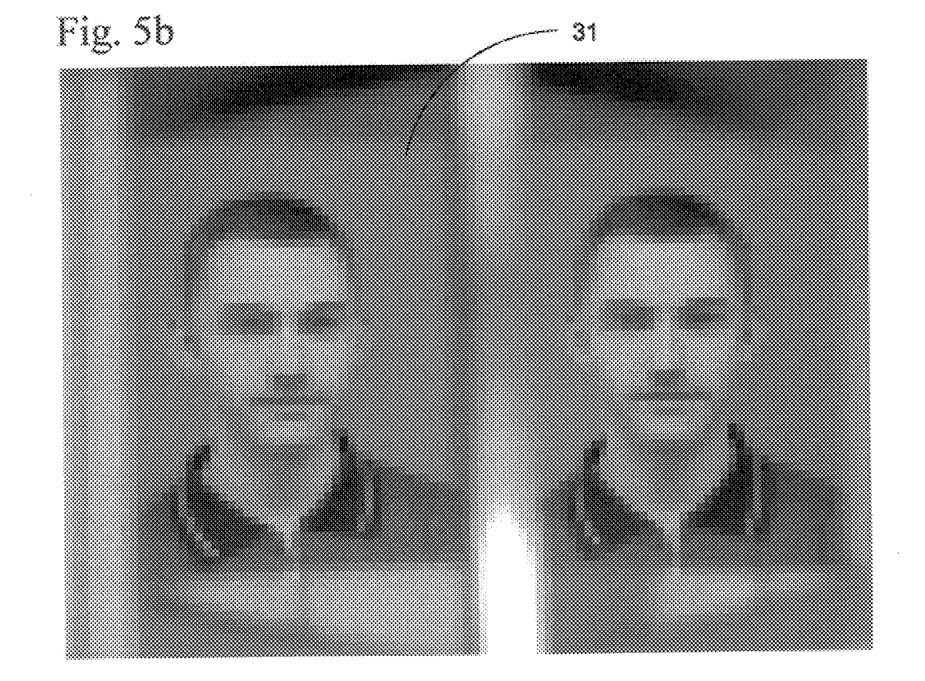
FIG. 5b shows an image of an actual scene according to the present invention.

A digital photocamera that takes 1024×768 images in JPEG format was used. FIG. 5a shows images of the calibration plate (30) and FIG. 5b shows images of the actual scene (31). Several fixed calibrations were performed, with different values of the convergence angle and focal distance. With the different values for B, f and $\Delta\alpha$, a least squares technique was applied to estimate w, a and b.

Figure 6:
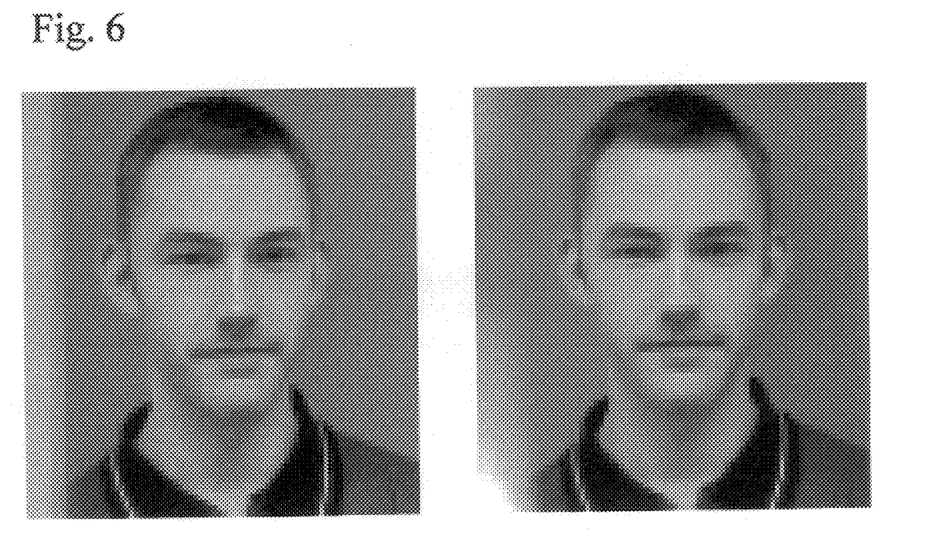
FIG. 6 shows a rectified image pair according to the present invention.
Figure 7:
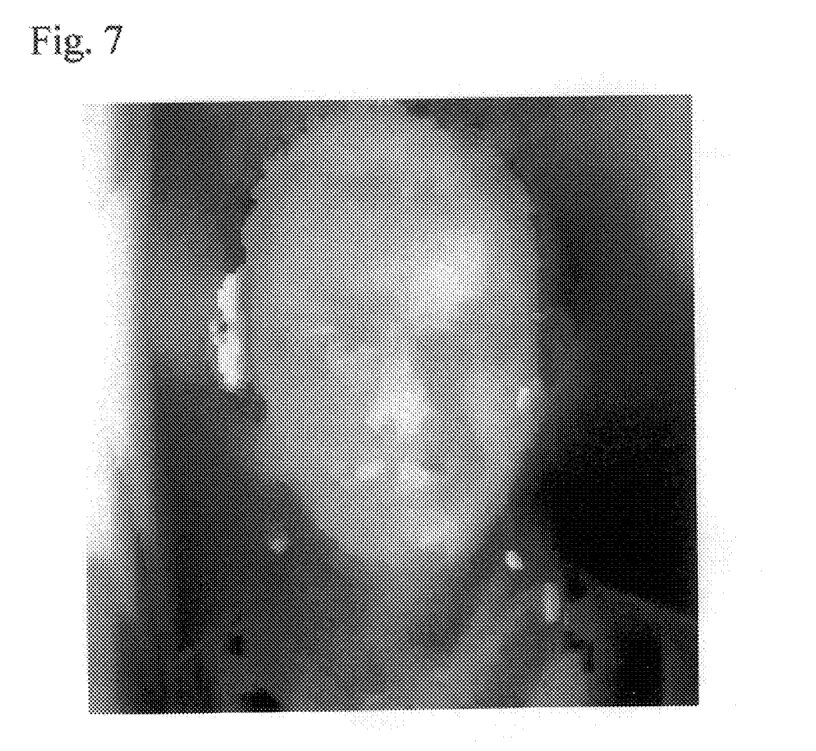
FIG. 7 shows a disparity field according to the present invention.
Figure 8:
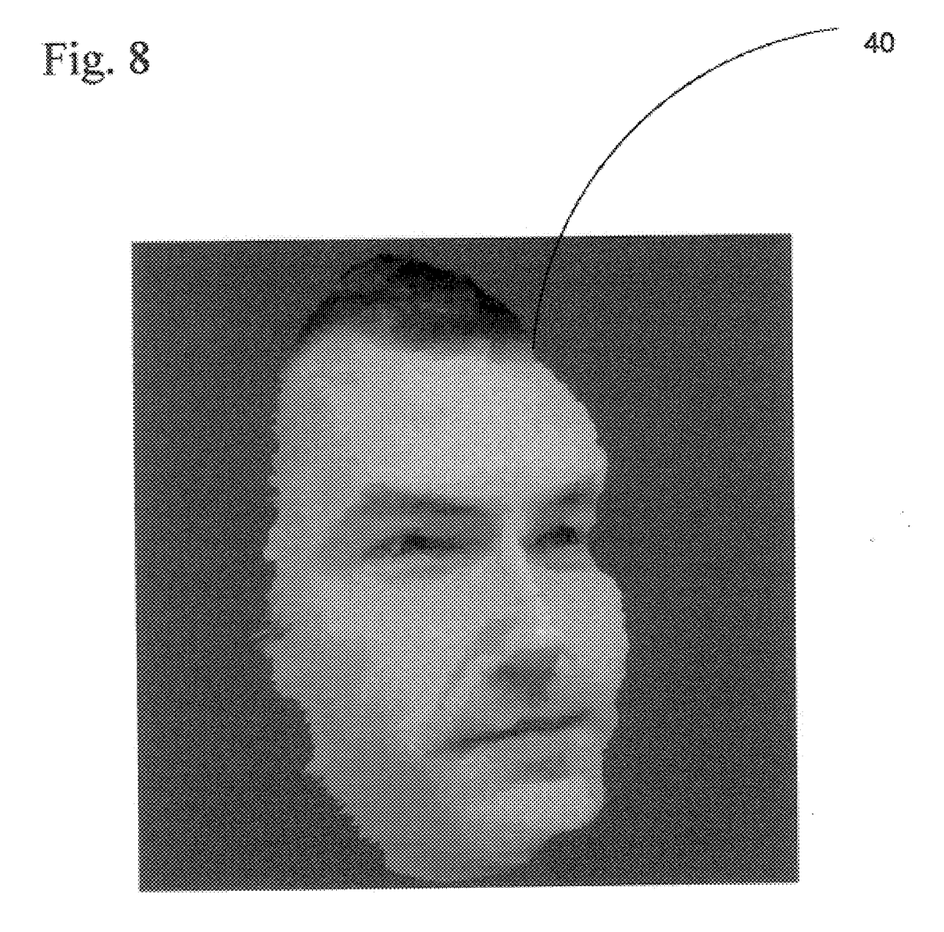
FIG. 8 shows a 3-D model according to a method of the present invention.

With the parameters from the fixed calibration, a good 3-D model was obtained from the scene image (31) in FIG. 5b. After splitting the scene image in a left and right image pair, the images were rectified [5], as shown in FIG. 6. All correspondences lie now on equal scan lines and 1-D disparity estimation was performed. A Markov Random Field disparity estimator [5] was used to obtain the disparity field shown in FIG. 7. After triangulation of all corresponding pixel pairs, the 3-D model (40) was obtained. FIG. 8 shows the details in the facial area.

The acquisition of 3-D scenes with a special device [7] enables stereo vision by a single hand-held camera (see FIG. 1). This system has several advantages. It is small and thus provides high user mobility, it needs only a single conventional recorder for storage and the use of a single camera is economical.

Both camera calibration and correspondence estimation benefit from the device. Correspondence estimation relies on photometric similarity between corresponding pixels. With this device, there are no photometrical differences between left and right cameras. Further, left and right shutter synchronization is guaranteed by definition. For camera calibration, it was shown that a simpler stereo camera model could be used since the virtual left and right cameras share some physical properties from the single real camera. In addition, the device allows for self-calibration methods, while still providing a means for the capturing of absolute scale.

The experiments showed that good 3-D models are obtained with the device. Currently the preferred method is a fixed calibration method, although a self-calibration method is also possible. The camera parameters obtained were well suited for the acquisition of a 3-D model.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

REFERENCES

[1] Faugeras, "Three-dimensional computer vision, a geometric viewpoint", MIT Press, 1993.
[2] F. Pedersini, D. Pele, A. Sarti and S. Tubaro, "Calibration and self-calibration of multi-ocular camera systems", in proceedings of the *International Workshop on Synthetic-Natural Hybrid Coding and Three Dimensional Imaging* (IWSNHC3DI'97), Rhodos, Greece, pp. 81–84, 1997.
[3] M. Pollefeys, R. Koch, M. Vergauwen and L. van Gool, "Flexible acquisition of 3D structure from motion", in proceedings of the *IEEE Image and Multidimensional Digital Signal Processing* (IMDSP) *Workshop '98*, pp. 195–198, 1998.
[4] P. A. Redert and E. A. Hendriks, "Self calibration of stereo cameras with lens distortion", *Proceedings of the IEEE Image and Multidimensional Digital Signal Processing* (IMDSP) *Workshop '98*, pp. 163–166, 1998.
[5] P. A. Redert, E. A. Hendriks and J. Biemond, "Correspondence estimation in image pairs", *IEEE Signal Processing Magazine*, special issue on 3D and stereoscopic visual communication, Vol. 16, No. 3, pp. 29–46, May 1999.
[6] J. Weng, P. Cohen and M. Herniou, "Camera calibration with distortion models and accuracy evaluation", in *IEEE Transactions on PAMI*, Vol. 14, No. 10, pp. 965–980, 1992.
[7] P. O. Zanen, "Single lens apparatus for three-dimensional imaging having focus-related convergence compensation", U.S. Pat. No. 5,532,777, Jul. 2, 1996.
[8] P. O. Zanen, "Method for three dimensional measurement and imaging having focus-related convergence compensation", U.S. Pat. No. 5,828,913, Oct. 27, 1998.
[9] P. O. Zanen, "Apparatus for three dimensional measurement and imaging having focus-related convergence compensation", U.S. Pat. No. 5,883,662, Mar. 16, 1999.

What is claimed is:

1. A method of acquiring a three-dimensional scene using a single hand held camera having a lens, attached to a lens attachment comprising a right and a left inner mirror, both inner mirrors being located in front of the lens facing inwardly along an optical axis of the lens toward the lens, covering substantially all of a field of view of the lens, the inner mirrors being connected together at one edge at the optical axis of the lens, such that the two inner mirrors form an acute angle symmetrical about the optical axis of the lens, a right and a left outer mirror, both being larger than the inner mirrors and located outward of the inner mirrors, facing outward toward the subject, such that substantially all of the field of view of the inner mirrors is covered by the outer mirrors, the outer mirrors being pivotable about a vertical axis, a ganging mechanism for simultaneously pivoting the outer mirrors about their vertical axes in opposite senses, having a control input for actuating the ganging mechanism, such that a movement of the control input causes the right and left outer mirrors to pivot equally, oppositely and simultaneously, such that a movement of the control input in one direction causes the fields of view of the outer mirrors to converge, and a movement of the control input in the opposite direction causes the fields of view of the outer mirrors to diverge, and an adapter for moving the control input of the ganging mechanism in response to actuation of a focusing means of the lens, connected to the control input of the ganging mechanism and the focusing means of the lens, such that when the lens is focused at a selected distance, the field of view of the outer mirrors converges at the selected distance, wherein the field of view of the lens of the single camera is split into two virtual cameras, each with half of the field of view, comprising the steps of:

a) deriving values for a, b, and w by performing a fixed calibration for at least one value of a convergence angle ($\Delta\alpha$) and at least one focal distance (f) wherein w is defined as a distance between an optical center of the single hand held camera and an optical center of each of the virtual cameras, and a and b are parameters estimated to establish a relationship between w and h, wherein h is a distance between the optical center of the single hand held camera and an intersection of the two inner mirrors;

b) recording an image of a scene using the single hand held camera and the lens attachment;

c) processing the recorded image using the value for the convergence angle ($\Delta\alpha$) and the focal distance (f); and d) storing a processed three-dimensional image.

2. The method of claim 1, wherein step (a) further comprises the steps of:

i) recording at least one calibration plate;

ii) splitting an image of the calibration plate into a left image and a right image;

iii) detecting the calibration plate; and iv) calibrating the calibration plate.

3. The method of claim 1, wherein step (c) further comprises the steps of:

i) splitting the image of the scene into a left image and a right image;

ii) performing correspondence estimation on the left image and the right image;

iii) performing self-calibration; and iv) performing triangulation.

4. The method of claim 1, further comprising the step of calculating a relationship between meters and angles using an equation $B=2w+2(h+w)\sin 2\Delta\alpha+\epsilon_0$ wherein B is defined as a camera baseline, and $\epsilon_0$ is defined as an error parameter.

5. The method of claim 1 further comprising, prior to step (b), the step of defining five reference frames.

6. The method of claim 5 wherein the five reference frames comprise:

a) a stereo frame;

b) a left lens frame;

c) a right lens frame;

d) a left projection frame; and e) a right projection frame.

7. The method of claim 6 wherein an orientation of the left and right lens frames are defined by two sets of Euler angles ($\phi_x$, $\phi_y$, $\phi_z$).

8. The method of claim 7, further comprising the step of introducing an equation that eliminates either $\phi_{x;L}$ or $\phi_{x;R}$.

9. The method of claim 8, wherein the equation is $\phi_{x;L}+\phi_{x;R}=0$.

10. The method of claim 8, wherein when the Euler angles are not equal to zero, additional equations $\phi_{x;L}=\epsilon_1$, $\phi_{x;R}=-\epsilon_1$ are used, such that $\epsilon_1$ is a small error parameter.

11. The method of claim 10, further comprising the step of calculating the equations $\phi_{y;L}=2\Delta\alpha+\epsilon_2$, $\phi_{x;R}=-2\Delta\alpha+\epsilon_3$.

12. The method of claim 6 wherein a position of the left and right projection frames relative to the left and right lens frames are defined by a single vector $OP_{PF}^{X_{LF}}$, $O_{PF}^{Y_{LF}}$, $O_{PF}^{Z_{LF}}$ wherein $O_{PF}^{X_{LF}}$ and $O_{PF}^{Y_{LF}}$ define an intersection of a lens optical axis with a total CCD and $O_{PF}^{Z_{LF}}$ is equal to the focal length f.

13. The method of claim 1, further comprising the step of calculating a distance h between an optical center of the single hand held camera and an intersection of the inner mirrors using the equation h=a+bf.

14. The method of claim 6 wherein an orientation of the left and right projection frames relative to the left and right lens frames is defined by a single set of Euler angles ($\theta_x$, $\theta_y$, $\theta_z$).

15. The method of claim 14, wherein $\theta_x$ and $\theta_y$ model the non-orthogonal CCD placement with respect to an optical axis such that $\theta_x=\epsilon_8$, $\theta_y=\epsilon_9$, $\theta_z=0$ where $\epsilon_8$ and $\epsilon_9$ are defined as error parameters.

16. The method of claim 14 wherein $\theta_z$ relates to a rotation of the projection frame.

17. The method of claim 1, further comprising the step of calculating a radial distortion parameter $K_3$ using the equation $K_3=\epsilon_{10}$, where $\epsilon_{10}$ is defined as an error parameter.

18. The method of claim 1, where a plurality of parameters in step (a) further comprise a baseline B, a pixel aspect ratio R and ten error parameters, $\epsilon_1$, $\epsilon_2$, $\epsilon_3$, $\epsilon_4$, $\epsilon_5$, $\epsilon_6$, $\epsilon_7$, $\epsilon_8$, $\epsilon_9$, and $\epsilon_{10}$, which are each assumed to be small.

19. The method of claim 1, further comprising the step of self-calibrating the scene using a plurality of parameters including a baseline B equal to 1, a convergence angle $\Delta\alpha$, a focal length f, a pixel aspect ratio R and ten error parameters, $\epsilon_1$, $\epsilon_2$, $\epsilon_3$, $\epsilon_4$, $\epsilon_5$, $\epsilon_6$, $\epsilon_7$, $\epsilon_8$, $\epsilon_9$, and $\epsilon_{10}$, which are each assumed to be small.

20. A three-dimensional scene created by the method of claim 1.

* * * * *